Patented Aug. 3, 1937

2,089,127

UNITED STATES PATENT OFFICE 2,089,127

MANUFACTURE OF GLYCEROL MONO-LACTATE

Ritchie Hart Lock, Chigwell, England, assignor to Howards and Sons Limited, Ilford, England, a British company No Drawing. Application July 29, 1936, Serial No. 93,309. In Great Britain April 10, 1935

12 Claims. (Cl. 260—106)

The preparation of glycerol esters of lactic acid, and in particular the monolactate, by direct action of lactic acid on glycerine is not a satisfactory method and involves a somewhat elaborate purification of the product obtained.

The present invention is based on the observation that the reaction of alcoholysis provides a satisfactory method of obtaining glycerol monolactate in a good state of purity. In contrast to direct esterification, the di- and trilactates are not formed in appreciable quantities, so that the purification of the product is simplified. Even when only a molecular proportion of glycerol is used there is no appreciable production of the di- and trilactates; hence it becomes possible to avoid the operation of separating the glycerol monolactate from these esters and from an excess of glycerol.

The invention accordingly consists in the manufacture of the mono-lactate of glycerol by reaction between glycerine and a lactic acid ester of an alcohol of boiling point below 100° C. preferably in approximately equimolecular proportions.

The procedure may consist in heating a mixture of about equimolecular proportions of the lactic acid ester and glycerin (which need not be chemically pure) in presence or absence of an esterification catalyst, whereby the alcohol liberated from the parent lactic ester distils and the monolactate of glycerin remains in the residue.

The temperature should be maintained below 100° C. in order to avoid side reactions. For this purpose, the reaction may occur in presence of a solvent or diluent of boiling point below 100° C., which may also serve to entrain the alcohol liberated in the reaction and thus facilitate its removal from the reaction mixture.

The following example illustrates the invention, the parts being by weight:—

There is prepared a mixture of 118 parts of ethyl lactate, 92 parts of glycerol, 36 parts of benzene and 0.25 part of sulphuric acid and the mixture, which is homogeneous, is boiled in a still provided with a fractionating column. Its boiling point is below 100° C. The vapours of benzene and alcohol which distil are condensed and washed with water and the benzene which separates as upper layer is returned continuously to the still. When alcohol no longer distils, the liquid in the still is neutralized by means of caustic soda solution and the benzene is removed by distillation, at first under atmospheric pressure and finally in vacuo for removing the last traces. There are obtained nearly 164 parts of glycerol monolactate, that is, the yield is nearly theoretical.

Prepared in the above manner, the product will contain a trace of sodium sulphate, the presence of which is not objectionable for most applications of the product; should a purer product be desired, barium hydroxide may be used instead of caustic soda solution for neutralizing the sulphuric acid in the reaction mixture and the solid matter then separated.

Instead of ethyl lactate there may be used, for instance, methyl lactate.

Glycerol monolactate is a useful solvent which can find application in various industries.

Having this described the nature of the said invention and the best means I know of carrying the same into practical effect, I claim:—

1. The process of producing glycerol monolactate, which comprises heating together approximately equimolecular proportions of glycerol and a lactic acid ester of an alcohol of boiling point below 100° C.

2. The process of producing glycerol monolactate, which comprises heating together at a temperature below 100° C. approximately equimolecular proportions of glycerol and a lactic acid ester of an alcohol of boiling point below 100° C.

3. The process of producing glycerol monolactate, which comprises heating together in presence of a diluent of boiling point below 100° C. approximately equimolecular proportions of glycerol and a lactic acid ester of an alcohol of boiling point below 100° C.

4. The process of producing glycerol monolactate, which comprises heating together in presence of an esterification catalyst approximately equimolecular proportions of glycerol and a lactic acid ester of an alcohol of boiling point below 100° C.

5. The process of producing glycerol monolactate, which comprises heating together in presence of an esterification catalyst and at a temperature below 100° C. approximately equimolecular proportions of glycerol and a lactic acid ester of an alcohol of boiling point below 100° C.

6. The process of producing glycerol monolactate, which comprises heating together in presence of an esterification catalyst and in presence of a diluent of boiling point below 100° C. approximately equimolecular proportions of glycerol and a lactic acid ester of an alcohol of boiling point below 100° C.

7. The process of producing glycerol monolactate, which comprises heating to boiling a mixture of benzene and approximately equimolecular proportions of glycerol and ethyl lactate in presence of a small proportion of sulphuric acid until alcohol no longer distils.

8. The process of producing glycerol monolactate, which comprises heating to boiling a mixture of benzene and approximately equimolecular proportions of glycerol and ethyl lactate in presence of a small proportion of sulphuric acid, condensing the vapours evolved, washing the condensate with water, returning to the reaction mixture the benzene thereby separated as upper layer until alcohol no longer distils, then freeing the reaction product from benzene by distillation and neutralizing the sulphuric acid in the product.

9. The process of producing glycerol monolactate, which comprises heating a lactic acid ester of an alcohol of boiling point below 100° C. with not materially less than an equimolecular proportion of glycerol.

10. The process of producing glycerol monolactate, which comprises heating a lactic acid ester of an alcohol of boiling point below 100° C. with not materially less than an equimolecular proportion of glycerol at a temperature below 100° C.

11. The process of producing glycerol monolactate, which comprises heating a lactic acid ester of an alcohol of boiling point below 100° C. with not materially less than an equimolecular proportion of glycerol in presence of a diluent of boiling point below 100° C.

12. The process of producing glycerol monolactate, which comprises heating a lactic acid ester of an alcohol of boiling point below 100° C. with not materially less than an equimolecular proportion of glycerol in presence of an esterification catalyst and a diluent of boiling point below 100° C.

RITCHIE HART LOCK.